United States Patent
Pfeiffer et al.

(10) Patent No.: US 6,462,661 B2
(45) Date of Patent: Oct. 8, 2002

(54) RF ID TAG ATTACHMENT TO A DISC DRIVE

(75) Inventors: Michael W. Pfeiffer, Savage; Richard G. Goodrich, Lakeville, both of MN (US); David R. King, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/893,203

(22) Filed: Jun. 27, 2001

(65) Prior Publication Data

US 2002/0060629 A1 May 23, 2002

Related U.S. Application Data (60) Provisional application No. 60/249,961, filed on Nov. 20, 2000.

(51) Int. Cl.⁷ .............................................. G08B 13/14
(52) U.S. Cl. ................... 340/572.8; 340/572.1; 340/572.7; 340/572.4; 340/825.3; 340/825.54
(58) Field of Search ........................... 340/572.8, 572.1, 340/572.7, 572.4, 825.3, 825.54

(56) References Cited

U.S. PATENT DOCUMENTS

| | | | |
|---|---|---|---|
| 4,827,395 A | 5/1989 | Anders et al. | 364/138 |
| 5,742,238 A | 4/1998 | Fox | 340/825.49 |
| 5,822,714 A | 10/1998 | Cato | 702/108 |
| 5,973,599 A | 10/1999 | Nicholson et al. | 340/572.8 |
| 5,995,006 A | * 11/1999 | Walsh | 340/572.7 |
| 6,094,793 A | 8/2000 | Szuba | 29/33 |
| 6,108,163 A | * 8/2000 | Boutaghou | 360/97.02 |
| 6,144,301 A | 11/2000 | Frieden | 340/572.8 |
| 6,147,606 A | * 11/2000 | Duan | 340/572.7 |
| 6,154,790 A | 11/2000 | Pruett et al. | 710/15 |
| 6,249,227 B1 | * 6/2001 | Brady et al. | 340/572.1 |

* cited by examiner

Primary Examiner—Daniel J. Wu
Assistant Examiner—Tai T. Nguyen
(74) Attorney, Agent, or Firm—Westman, Champlin & Kelly (57) ABSTRACT

An apparatus and associated method for attaching an RFID tag to a disc drive housing. An RFID tag attaches to a tag housing that includes a post extending outwardly from the tag housing. A post hole in the disc drive housing receives the post. The post is removably retained in the post hole with resilient material. The RFID tag is spaced away from the disc drive housing. Useful for recording completion of production processes in a clean room environment.

14 Claims, 7 Drawing Sheets

RF ID TAG ATTACHMENT TO A DISC DRIVE

CROSS-REFERENCE TO RELATED APPLICATION

This application claims priority benefits from U.S. Provisional Application 60/249,961 titled "Use of RFID Tag and Method of Attachment," filed Nov. 20, 2000 and identified as Docket Number SEA9986.01.

FIELD OF THE INVENTION

The present invention relates generally to disc drive data storage devices, and more particularly without limitation to attaching radio frequency identification (RFID) tags to disc drives and disc drive subassemblies.

BACKGROUND OF THE INVENTION

As computer disc drives are manufactured, they pass through a large number of manufacturing processes such as cleaning, assembly, testing, adjustment, inspection and the like. In order to ensure that each disc drive successfully completes each of the large number of manufacturing processes in a proper sequence, a process record is kept for each disc drive.

One known method of keeping process records is to mount a radio frequency identification (RFID) tag on a pallet or product carrier upon which the disc drive is temporarily mounted during manufacturing. The RFID tag has a memory in which product and process information can be stored and read during manufacture using a radio frequency (RF) transceiver.

As manufacturing processes have advanced, manufacturing equipment is now able to handle disc drives without the use of a pallet or carrier. There is a desire to mount the RFID tags to disc drive housings, however, there are a number of design problems encountered in mounting RFID tags to disc drives themselves.

The disc drive housing is metal and tends to shield the RFID tag from reliable communication with its associated transceiver. The tag needs to be removable and reusable, but many removable attachment methods are incompatible with the clean room environment of disc drive manufacture. The die cast disc drive housing is limited as to the size and draft angles of features that can be included for attachment.

RFID tags that can be reusably attached to a disc drive and methods for using such RFID tags with a disc drive are needed that will be compatible with clean room conditions, compatible with die casting limitations, and that will not excessively shield the RFID tag from radio frequency communication.

SUMMARY OF THE INVENTION

Disclosed are embodiments of an apparatus and an associated method of attaching the RFID tag assembly to a disc drive. The RFID tag assembly includes an RFID tag and a tag housing attached to the RFID tag. The tag housing includes a post extending outwardly from the RFID tag. The post is shaped to fit in a post hole and space the RFID tag away from a disc drive housing. Resilient material is on the post and adapted to retain the RFID tag assembly in the post hole.

These and various other features as well as advantages which characterize embodiments of the present invention will be apparent upon reading of the following detailed description and review of the associated drawings.

DETAILED DESCRIPTION OF ILLUSTRATIVE EMBODIMENTS

In the embodiments illustrated below, an RFID tag is attached to a disc drive housing, but kept spaced away from the disc drive housing to reduce undesired shielding of the RFID tag by the housing. The RFID tag attaches to a plastic resin housing that includes a post extending outwardly from the RFID tag. The disc drive housing includes a post hole that receives the post. The post is removably retained in the post hole by friction with a resilient material such as a synthetic rubber O ring, a polymer clip, a garter spring, or by a post that is resilient. The arrangement can be used in a clean room environment to record completion of production processes and ensure that production processes are completed in the proper sequence.

As manufacturing equipment for disc drives improves, the pallet or product carrier previously used to carry the disc drive along the production line is no longer needed. Manufacturing equipment can now handle disc drives without the use of a pallet or carrier. The RFID tag was previously mounted to the carrier or pallet.

There is a desire to mount RFID tags to disc drives for ensuring that all manufacturing processes are completed, however there are a number of problems encountered in mounting RFID tags to disc drives themselves.

When directly mounted to a disc drive, the RFID tag needs a removable mounting, so that the RFID tag can be removed at the end of the manufacturing process, and reused. However, known low cost approaches to removable mounting to metal die casting, such as self-threading machine screws or adhesives, cut metal chips from the die casting or leave friable residues that contaminate the clean room environment used in disc drive manufacture.

At the beginning of a disc drive assembly line, the disc drive comprises only the die cast metal frame. When an RFID tag is mounted closely to such an electrically conductive frame, the metal shields the RFID tag so that radio frequency communication from a nearby communication antenna can't be received reliably. It becomes difficult to reliably communicate data to and from the RFID tag without closely and carefully positioning an antenna to overcome the shielding afforded by the die cast housing for each manufacturing process.

The ability to include shapes in a die casting of a disc drive that can be used for retaining an RFID tag is very limited because of the need to provide draft on die cast surfaces that allow the die casting to be conveniently and economically removed from its die after casting. Modem disc drives are very compactly designed and it is difficult to add protrusions to the die cast housing for retaining an RFID tag without increasing size.

An RFID tag that can be reusably attached to a disc drive and an associated method for using such an RFID tag with a disc drive is disclosed that is compatible with clean room conditions, compatible with die casting limitations, and that does not excessively shield the RFID tag from radio frequency communication.

The RFID tag is small, inexpensive and reusable, and the associated method of attachment is automatable and universal among many different product designs and form-factors. Examples of the apparatus and associated attachment method are described below in connection with FIGS. 1–12.

Figure 1:
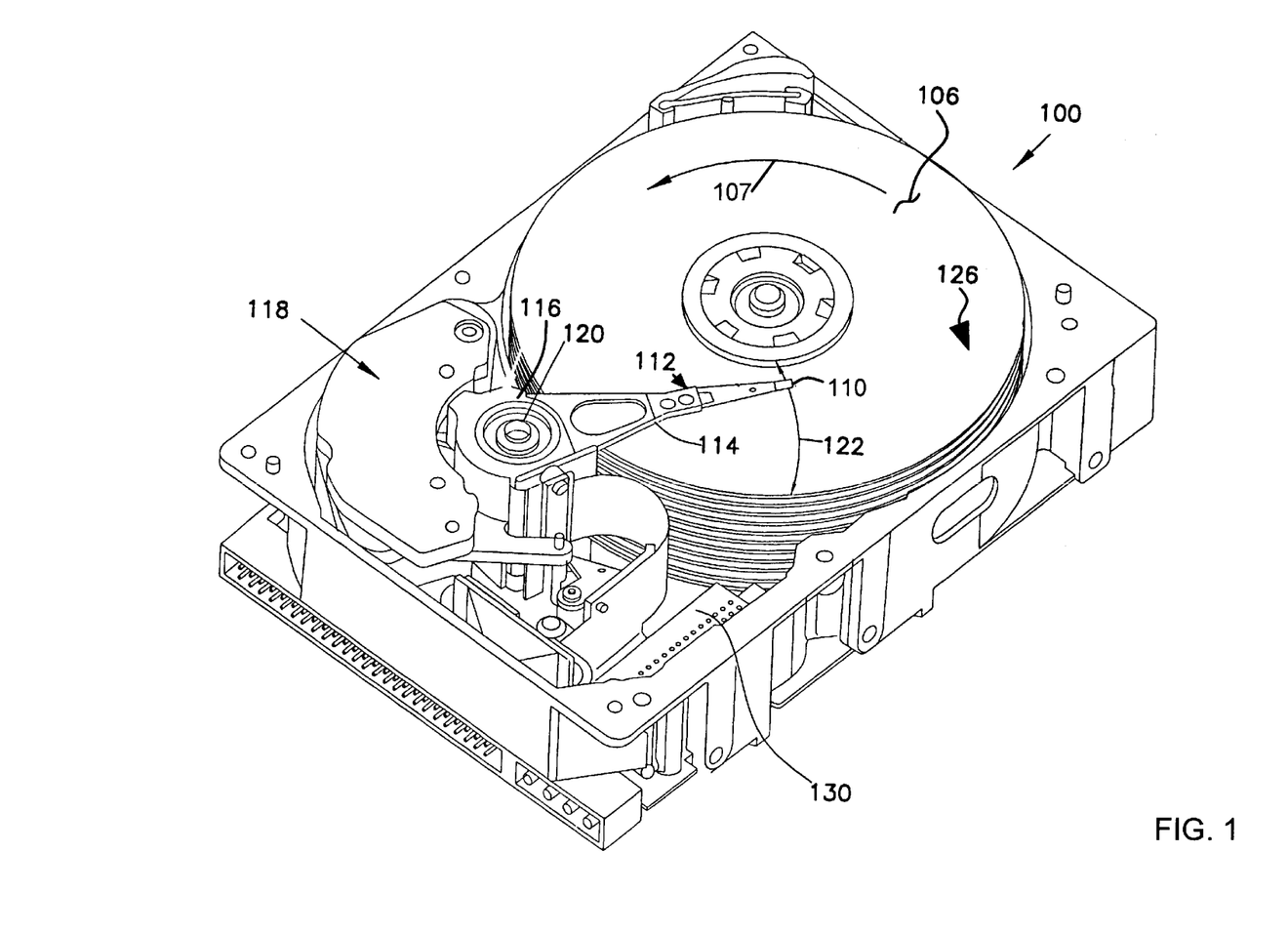
FIG. 1 illustrates a top isometric view of a disc drive.

In FIG. 1, an embodiment of a disc drive storage device 100 is illustrated. Disc drive 100 includes a disc pack 126 having storage surfaces 106 that are typically layers of magnetic material that are deposited using microstructure fabrication techniques. The disc pack 126 can include a stack of multiple discs and a read/write head assembly 112 includes a read/write transducer or head 110 for each stacked disc. The head 110 is typically formed using microstructure fabrication techniques. Disc pack 126 is spun or rotated in a direction as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive 100.

Disc drive 100 requires complex assembly procedures and includes many moving components that fit together with extremely small tolerances, requiring a clean room environment for manufacture to prevent damage from contaminants such as dust. Typically, the disc drive head 110 slides over the storage surface 106 in the disc drive 100 as illustrated. If there are particles of a large enough dimension between the sliding surfaces, then there is an increased risk that one of the sliding surfaces may be damaged during operation. For example, in modern disc drives a critical dimension can approach only a few nanometers between the head 110 and the storage surface 106. Contaminant particles can cause damage and need to be kept away from the sliding surfaces during assembly of the disc drive 100. An RFID tag mounting is illustrated below which avoids introducing contaminant particles into the manufacturing environment for the disc drive.

Figure 2:
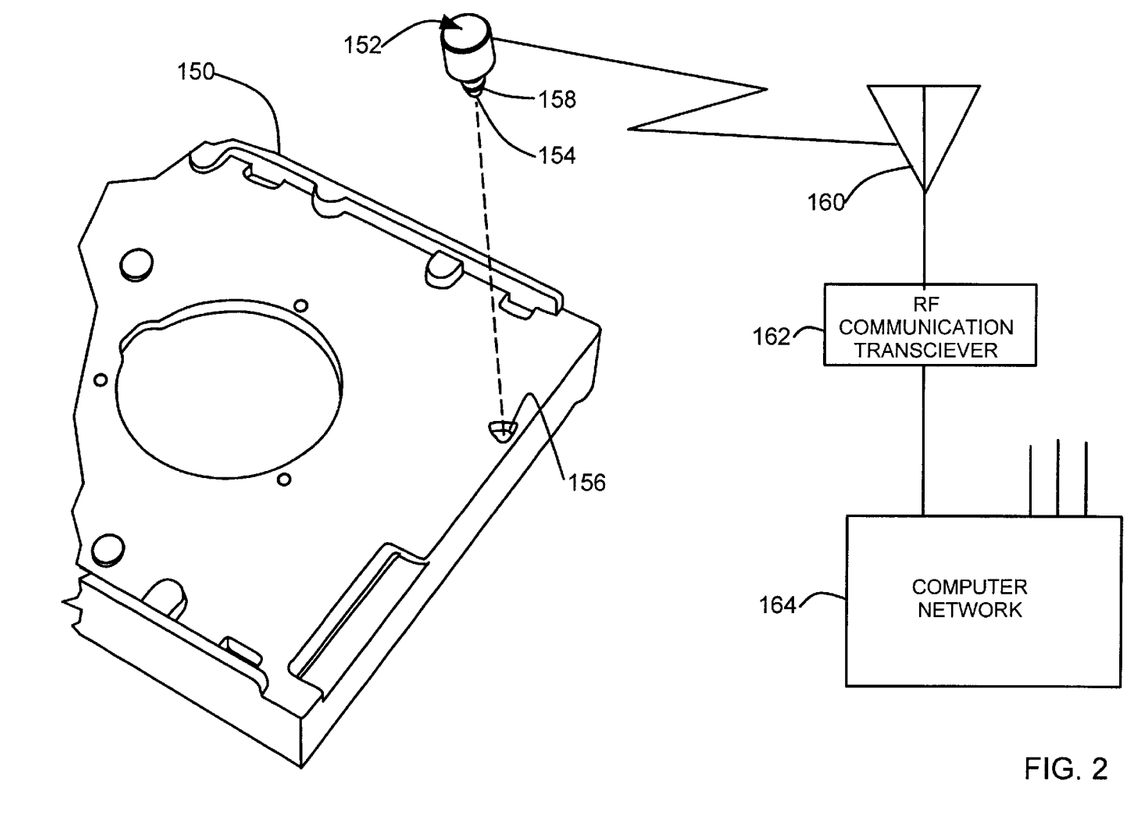
FIG. 2 illustrates a bottom isometric exploded view of a portion of a disc drive and an RFID tag assembly.

FIG. 2 illustrates a partial bottom isometric exploded view of a die cast disc drive housing 150 and an RFID tag assembly 152. The RFID tag assembly 152 includes a protruding post 154 that is secured in a post hole 156 by friction fit of a resilient member such as an O ring 158. The RFID tag assembly 152 includes an RFID tag (as described below in connection with FIG. 3) that communicates with an antenna 160. The antenna 160 is connected to an RF communication transceiver 162. RF communication transceiver 162 is preferably connected to a computer network 164 for control of the RF transceiver 162. In operation, the disc drive housing 150 will move along a production line and encounter a number of arrangements of antennae 160 and transceivers 162 that are coupled to a common computer network 164. The RFID tag in RFID tag assembly 152 has a memory in which product and process information is stored during manufacture by transmissions from antennae 160. The computer network 164 can also store information concerning the progress of each RFID tag on the production floor through various production processes.

The RFID tag assembly 152 is explained in more detail below in connection with FIGS. 3–6.

Figure 3:
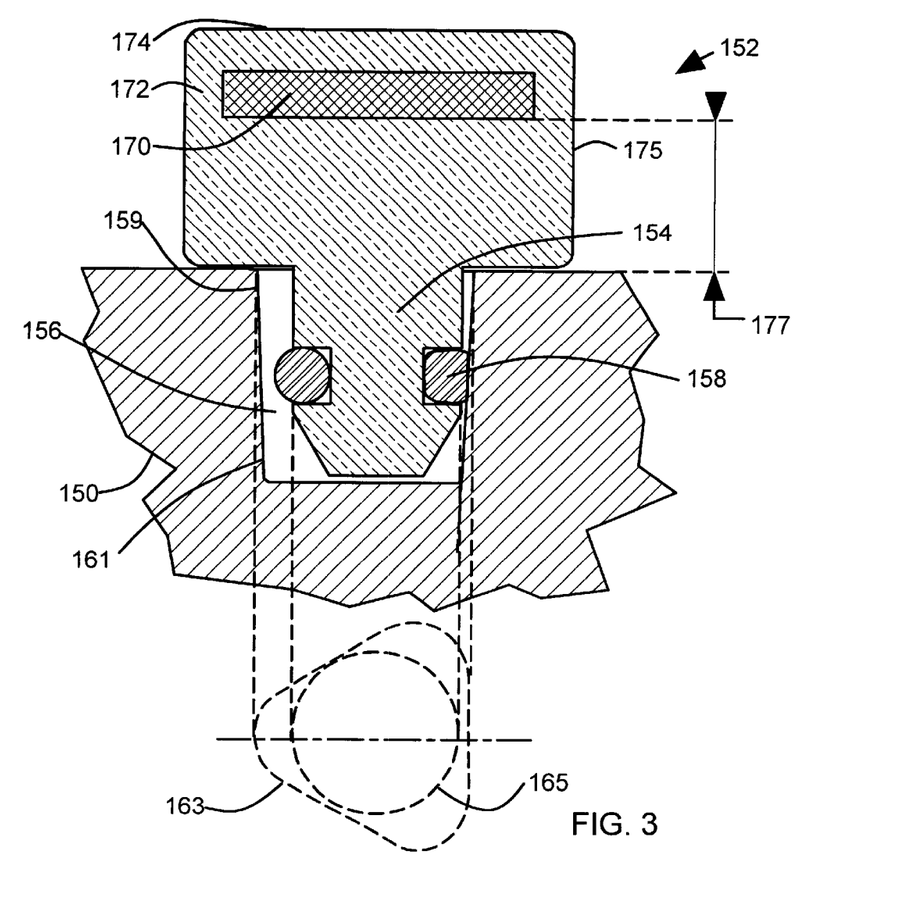
FIG. 3 illustrates a cross-sectional view of an RFID tag assembly mounted in a die cast frame of a disc drive.

FIG. 3 illustrates a cross-sectional view of the RFID tag assembly 152 mounted in a die cast frame 150 of a disc drive. The RFID tag assembly 152 includes an RFID tag 170 that is of conventional design. RFID tag 170 is attached to, and preferably embedded in, a plastic resin housing 172. Housing 172 has a generally flat top surface 174 and a generally cylindrical side wall 175 which serves as an automated tool grip or hand grip for inserting and removing the RFID tag assembly 152 from the die cast frame 150. RFID tag assembly 152 also includes a post 154 that extends outwardly from the housing 172 as illustrated. A post hole 156 is cast into frame 150 and, as illustrated, has a natural draft angle along its side walls conducive to the die casting process. Because of the draft angle, the post hole 156 is slightly larger at its opening 159 than it is at its base 161. The draft can make it difficult to securely engage something in hole 156.

As illustrated at 163, hole 156 can have a generally triangular shape or cross-section. Post 154, however, preferably has a generally round cross-section as illustrated at 165. O ring 158 is a body of resilient material that provides for a secure friction fit of the post 154 within the post hole 156. The open spaces between the generally triangular shape of the post hole 156 and the generally round shape of the post 154 provide venting for the post hole 156 so that air is not trapped in the post hole 156. This venting makes it easier to slide the post 154 in and out of the post hole 156.

The RFID tag 170 is spaced away from the metal die cast housing 150 by a spacing 177. The spacing 177 is selected based on the needs of the application to reduce problems with shielding of the the RFID tag 170 to an acceptable level.

Figure 4:
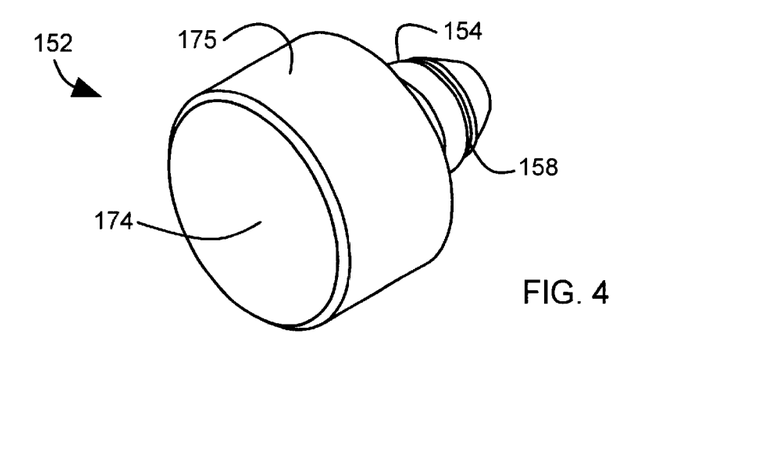
FIG. 4 illustrates an isometric view of an RFID tag assembly.

FIG. 4 illustrates an isometric view of the RFID tag assembly 152 shown in FIG. 3.

Figure 5:
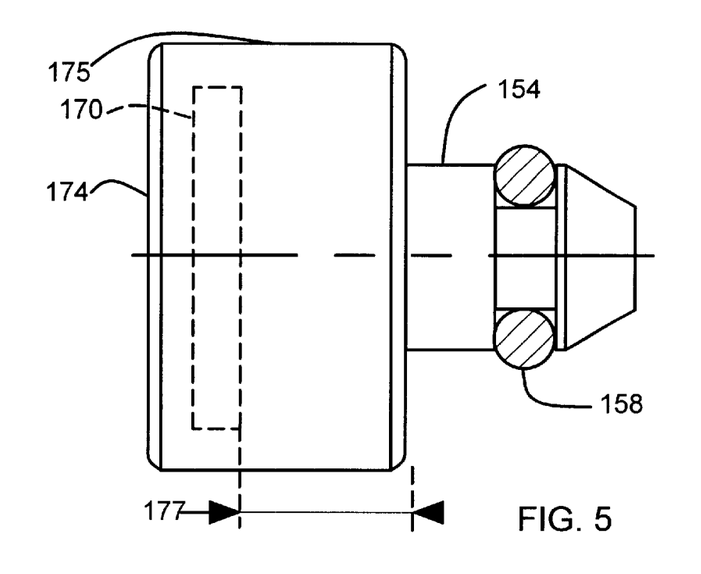
FIG. 5 illustrates a partial cross-sectional side view of an RFID tag assembly.

FIG. 5 illustrates a partial cross-sectional side view of the RFID tag assembly 152 shown in FIG. 3.

Figure 6:
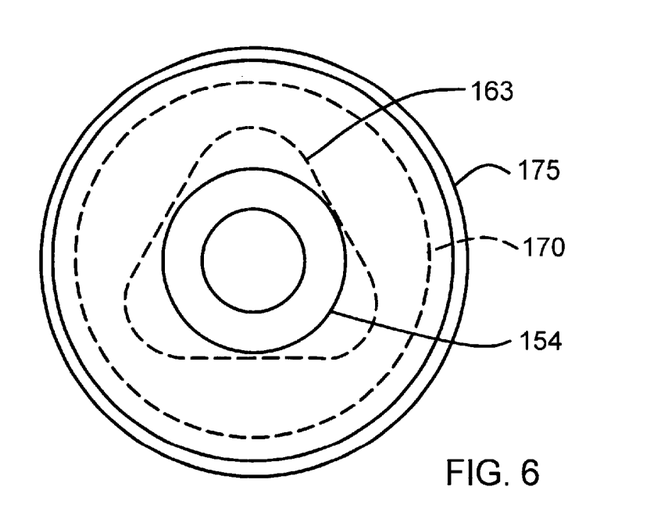
FIG. 6 illustrates a bottom view of an RFID tag assembly.

FIG. 6 illustrates a bottom view of the RFID tag assembly 152 shown in FIG. 3.

Figure 7:
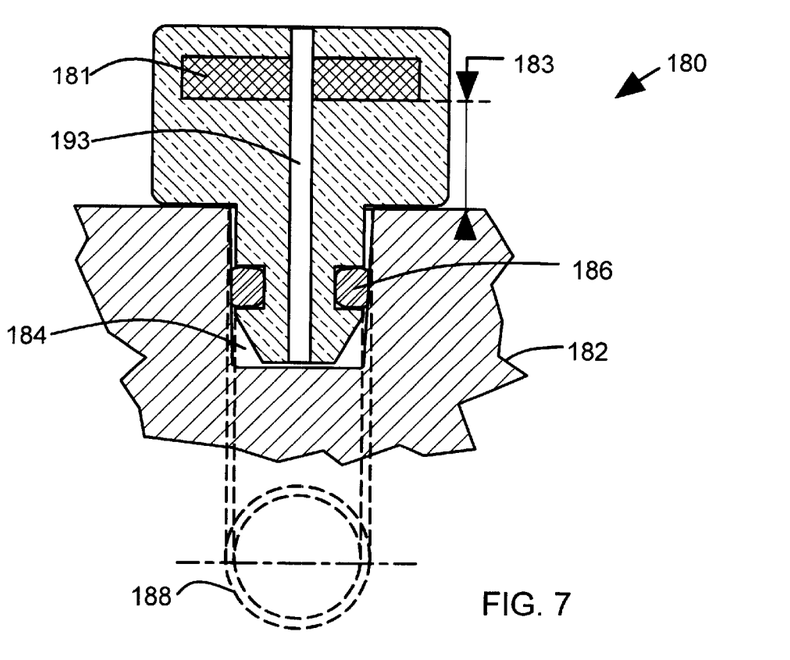
FIG. 7 illustrates a cross-sectional view of a first alternative RFID tag assembly and a die cast frame.

FIG. 7 illustrates a cross-sectional view of a first alternative RFID tag assembly 180 removably retained in a post hole 184 in a die cast frame 182 by a resilient member such as rubber O ring 186. As illustrated at 188, the post hole 184 has a generally round cross section and receives a generally round post on RFID tag assembly 180. The RFID tag assembly 180 is similar to the RFID tag assembly 152 (FIG. 3) except that RFID tag assembly 180 includes a longitudinal vent hole 193 which permits air flow in and out of the post hole 184 when the RFID tag assembly is in the post hole 184. RFID tag 181 includes a hole that is aligned with vent hole 193.

Figure 8:
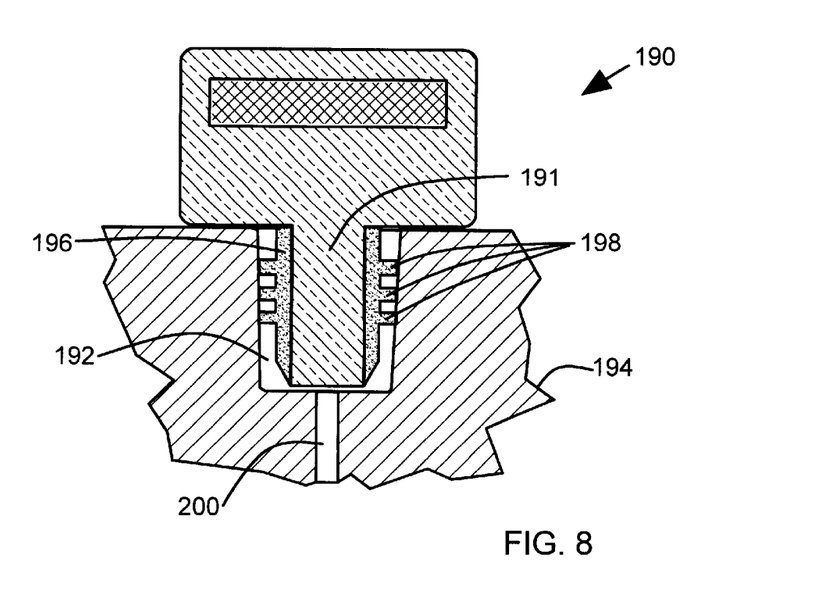
FIG. 8 illustrates a cross-sectional view of a second alternative RFID tag assembly and a die cast frame.

FIG. 8 illustrates a cross-sectional view of a second alternative RFID tag assembly 190 removably retained in a round post hole 192 in a die cast frame 194 by a molded sleeve 196 of resilient material such as polyurethane. The RFID tag assembly 190 includes a post 191 with a generally round cylindrical shape. The molded sleeve 196 fits tightly on the post 191. Molded sleeve 196 includes multiple outer ribs 198 that frictionally engage the wall of the post hole 192. FIG. 8 also illustrates a vent hole 200 provided in the die cast frame 194.

Figure 9:
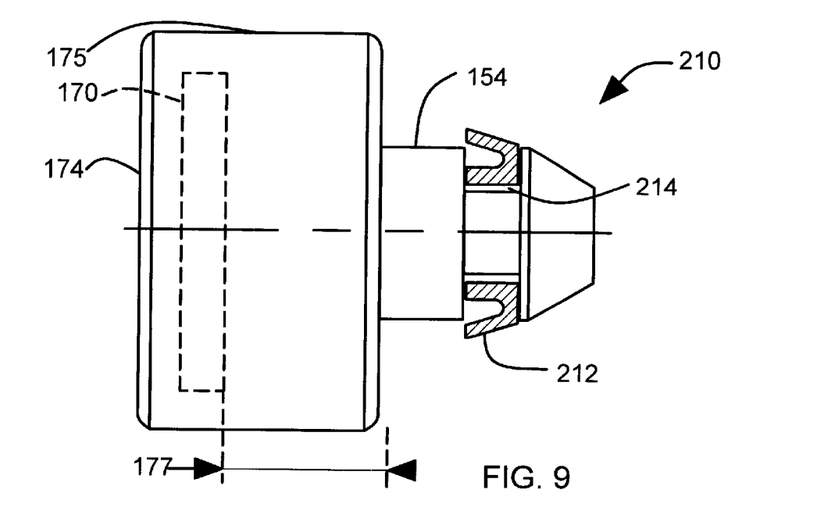
FIG. 9 illustrates a third alternative RFID tag assembly including a a clip shown in cross-section.
Figure 10:
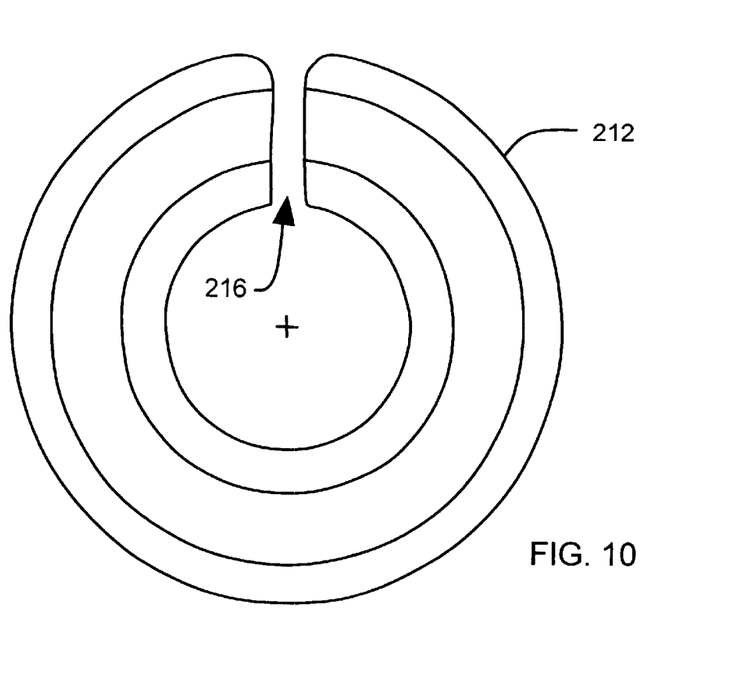
FIG. 10 illustrates a plan view of the clip shown in FIG. 9.

FIGS. 9–10 illustrate a third alternative RFID tag assembly 210. RFID tag assembly 210 is similar to RFID tag assembly 152 (FIGS. 3–6) except that the O ring 158 of RFID tag 152 assembly has been replaced with a clip 212 on RFID tag assembly 210. Clip 212 is illustrated in cross-section in FIG. 9 and is illustrated in plan view in FIG. 10. Clip 212 is preferably formed of plastic resin such as Delrin and fits loosely in a circumferential groove 214 in post 154. Clip 212 preferably includes a split or gap 216 that enhances the ability of clip 212 to compress resiliently upon insertion in a post hole. The split or gap 216 enhances the resiliency of clip 212.

Figure 11:
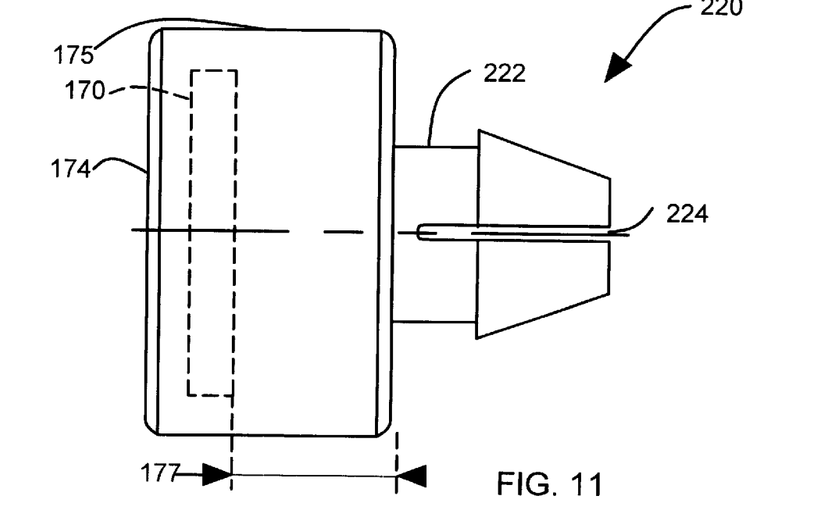
FIG. 11 illustrates a fourth alternative RFID tag assembly including a post with a longitudinal groove.

FIG. 11 illustrates a fourth alternative RFID tag assembly 220 including a post 222 with a longitudinal groove 224. The groove 222 enhances the resiliency of the end of post 222, and post 222 can be secured by friction in a post hole directly. The end of the post 222 has increased resiliency because of the groove 224.

Figure 12:
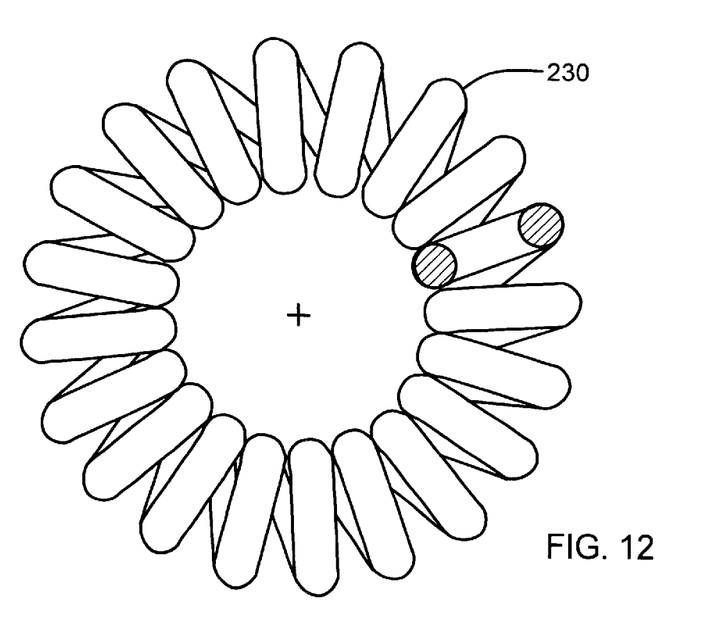
FIG. 12 illustrates a garter spring.

FIG. 12 illustrates a garter spring 230. Garter spring 230 is resilient and can be used in place of O ring 158 or clip 212 on an RFID tag assembly.

Depending on the needs of the production process, various features shown in the embodiments illustrated in FIGS. 2–12 can be appropriately adapted for use with other embodiments illustrated in FIGS. 2–12 to operate in accordance with the invention.

In conclusion, an RFID tag assembly (152, 180, 190, 210, 220) and an associated method of attaching the RFID tag assembly to a disc drive housing (150,182,194) are provided. The RFID tag assembly includes an RFID tag (170,181) and a tag housing (172) attached to the RFID tag. The plastic resin housing includes a post (154) extending outwardly from the RFID tag. The post is shaped to fit in a post hole and space the RFID tag away from the disc drive housing. Resilient material is disposed on the post and adapted to retain the RFID tag assembly in the post hole.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the RFID tag while maintaining substantially the same functionality without departing from the scope and spirit of the present invention. In addition, although the preferred embodiment described herein is directed to an RFID tag for a magnetic disc drive, it will be appreciated by those skilled in the art that the teachings of the present invention can be applied to other systems, like magnetooptical drives or optical drives, without departing from the scope and spirit of the present invention.

What is claimed is:

1. A method of attaching an RFID tag to a disc drive, comprising:

providing an RFID tag attached to a housing that includes a post extending outwardly from the housing;

providing a post hole in the disc drive housing; and removably retaining the post in the post hole with a resilient material interposed therebetween such that the RFID tag is spaced away from the disc drive.

2. The method of claim 1, further comprising:

supporting the resilient material in a groove formed in the post.

3. The method of claim 1, further comprising:

forming the post hole in a generally triangular shape; and forming the post in a generally round shape.

4. The method of claim 1, further comprising:

forming the post hole in a generally round shape;

forming the post in a generally round shape; and providing a longitudinal passage through the post.

5. The method of claim 1, further comprising:

forming the post hole in a generally round shape;

forming the post in a generally round shape; and providing a vent hole passing through the disc drive housing.

6. An RFID tag assembly, comprising:

an RFID tag;

a housing attached to the RFID tag and including a post extending outwardly from the housing, the post shaped to fit in a post hole in a disc drive housing and space the RFID tag away from the disc drive housing; and a resilient material disposed on the post and adapted to frictionally retain the post in the post hole.

7. The RFID tag assembly of claim 6 wherein the post includes a groove and the resilient material comprises an O ring receivingly engaged in the groove.

8. The RFID tag assembly of claim 7 wherein the post is adapted to fit in a round post hole and the housing includes a vent extending through the post.

9. The RFID tag assembly of claim 6 wherein the post has a generally round cylindrical shape and the resilient material comprises a sleeve attached to the post.

10. The RFID tag assembly of claim 9 wherein the sleeve includes outer ribs adapted to engage the post hole.

11. The RFID tag of claim 6 wherein the resilient material comprises a clip.

12. The RFID tag of claim 6 wherein the resilient material is integral with the post, the post further comprising a longitudinal groove.

13. The RFID tag of claim 6 wherein the resilient material comprises a garter spring.

14. A disc drive, comprising:

a disc and a read/write head; and a disc drive housing including a post hole adapted to receive a post of an RFID tag assembly; an RFID tag;

a housing attached to the RFID tag and including a post extending outwardly from the housing, the post being disposed in the post hole;

a resilient material disposed on the post and retaining the RFID tag assembly in the post hole.

* * * * *